(12) United States Patent
Saroya

(10) Patent No.: US 7,012,748 B2
(45) Date of Patent: Mar. 14, 2006

(54) METHOD FOR ADJUSTING A WAVE PLATE FOR AN IMAGING SYSTEM

(75) Inventor: Jagtar Singh Saroya, Washougal, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 10/211,020

(22) Filed: Aug. 2, 2002

(65) Prior Publication Data

US 2002/0186471 A1 Dec. 12, 2002

Related U.S. Application Data

(63) Continuation of application No. 09/773,396, filed on Jan. 31, 2001.

(51) Int. Cl.
*G02B 27/28* (2006.01)
*G02B 5/30* (2006.01)

(52) U.S. Cl. ...................................... 359/499; 359/117
(58) Field of Classification Search ................ 359/495, 359/497, 501, 499; 353/20; 349/9, 58, 60, 349/18, 75, 76, 117–121
See application file for complete search history.

(56) References Cited

U.S. PATENT DOCUMENTS

| | | | |
|---|---|---|---|
| 3,938,877 A | | 2/1976 | Strumia et al. |
| 4,343,535 A | * | 8/1982 | Bleha, Jr. ...................... 349/9 |
| 4,408,839 A | | 10/1983 | Wiener-Avnear |
| 4,936,680 A | | 6/1990 | Henkes et al. |
| 5,042,921 A | | 8/1991 | Sato et al. |
| 5,327,270 A | * | 7/1994 | Miyatake ...................... 349/9 |
| 5,357,370 A | | 10/1994 | Miyatake |
| 5,446,510 A | | 8/1995 | Mitsutake et al. |
| 5,459,593 A | | 10/1995 | Ootaki |
| 5,576,854 A | | 11/1996 | Schmidt et al. |
| 6,243,065 B1 | * | 6/2001 | Robrish et al. ............... 345/97 |
| 6,460,998 B1 | | 10/2002 | Watanabe |

* cited by examiner

*Primary Examiner*—Mark A. Robinson
*Assistant Examiner*—Alessandro Amari
(74) *Attorney, Agent, or Firm*—Chernoff, Vilhauer, McClung & Stenzel

(57) ABSTRACT

A compact mounting for a wave plate permits convenient rotational adjustment of the wave plate through an angle of at least one-half revolution to exploit asymmetry in the optical characteristics of the wave plate.

20 Claims, 3 Drawing Sheets

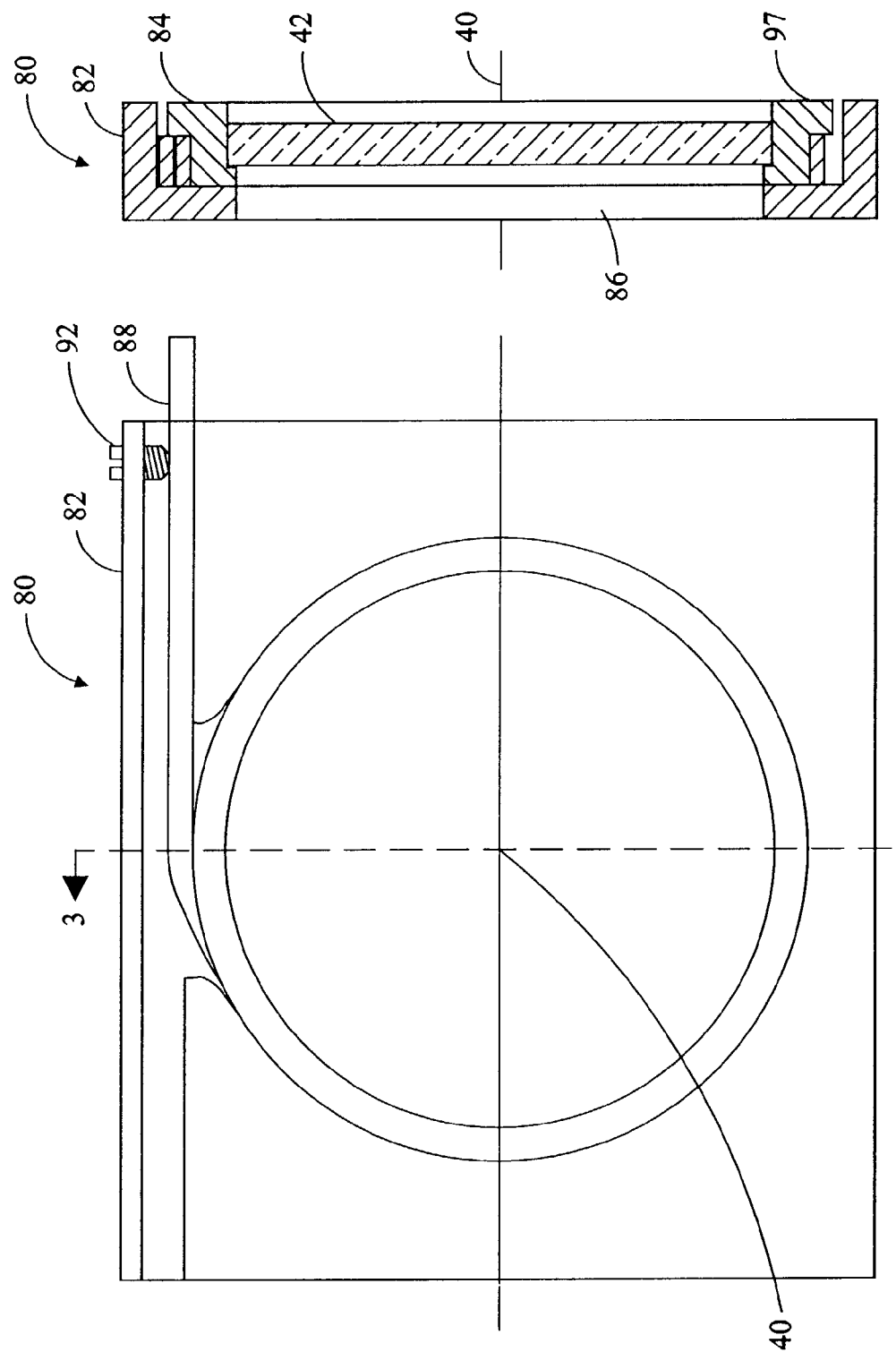

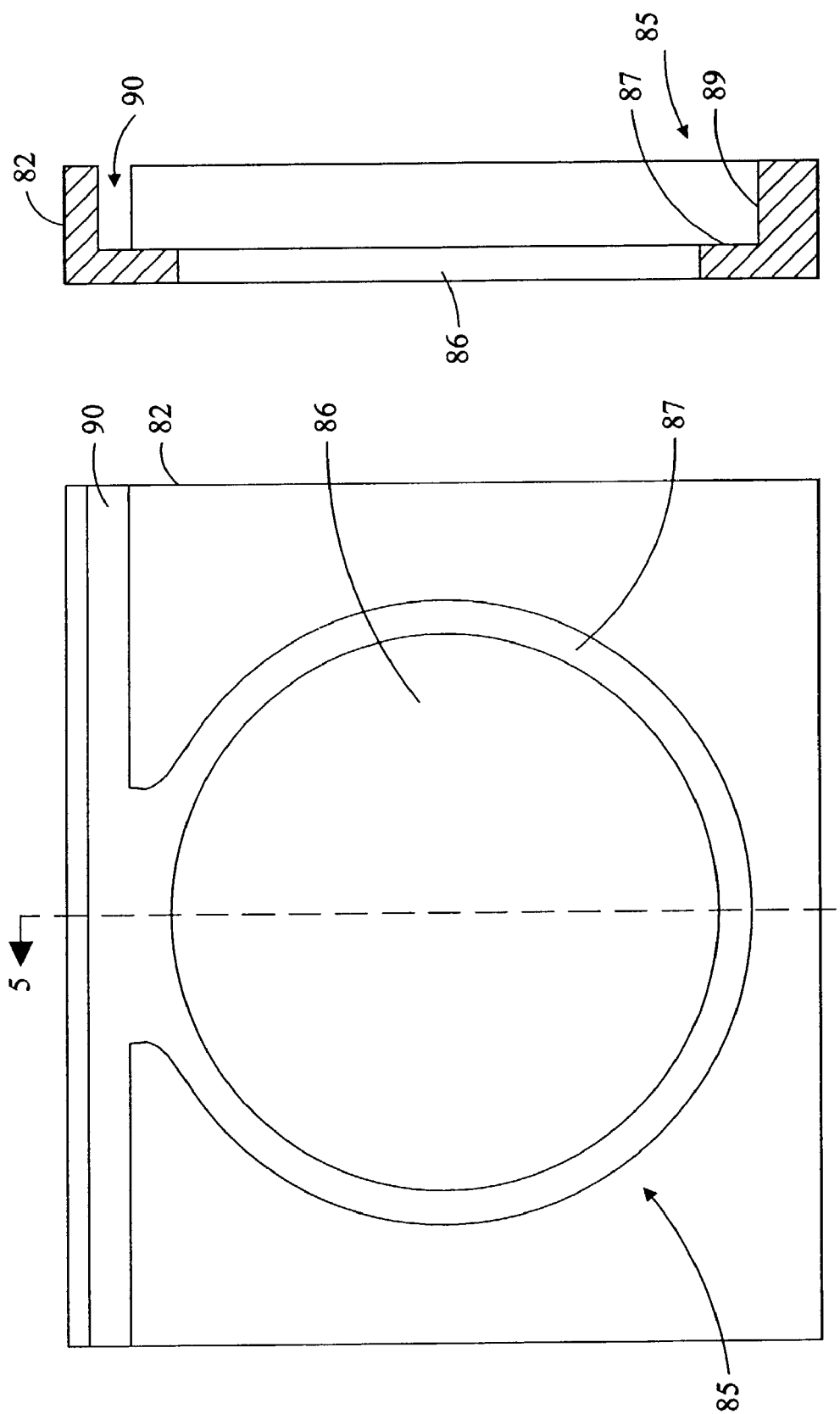

METHOD FOR ADJUSTING A WAVE PLATE FOR AN IMAGING SYSTEM

CROSS-REFERENCE TO RELATED APPLICATIONS

This application is a continuation and claims the benefit of U.S. patent application Ser. No. 09/773,396, filed on Jan. 31, 2001.

BACKGROUND OF THE INVENTION

The present invention relates to an apparatus for mounting an optical retarder or wave plate.

A retarder or wave plate is an optical element that changes the polarization of an incident light wave. In principle, the retarder causes the phase of one of the constituent coherent polarization states to lag behind the other by a predetermined amount. For example, a quarter-wave plate introduces a relative phase shift of 90 degrees ($\pi/2$) between the constituent orthogonal o- and e- components of a light wave. Quarter-wave plates are commonly used to convert elliptically polarized light to linear polarized light or transform linear polarized light to circular polarized light. Another common wave plate is the half-wave plate. The half-wave plate introduces a relative phase shift of 180° ($\pi$) to incident polarized light. Half-wave plates are commonly used to rotate the polarization vector of linear polarized light or to convert the sense of circular polarized light.

An exemplary use of a quarter-wave plate is in the construction of a liquid crystal light valve projector such as that disclosed by Schmidt et al. in U.S. Pat. No. 5,576,854. Schmidt et al. disclose that the perceived quality of a projected image can be improved by making the "off" or black state as black as possible. This increases the contrast between light and dark areas of the projected image. In a liquid crystal light valve projector, light from a source is projected onto a polarizer which reflects S-polarized light to a liquid crystal panel. If a part of the liquid crystal light panel is in the "on" state, the liquid crystals become birefringent and convert the S-polarized light to P-polarized light which is reflected back to the polarizer. This light passes through the polarizer and a lens and then on to a projection screen to produce a "lighted" condition on the screen. If the light valve is in its "off" state, a mirror behind the liquid crystal layer reflects the S-polarized light back onto the polarizing surface. S-polarized light striking the polarizer is reflected from the polarizer in the direction of the light source and away from the viewing screen to produce a "black" screen condition.

However, the polarization process is not perfectly efficient and the generally S-polarized light reflected from the polarizer includes a small portion of light that is not S-polarized with respect to the polarizer. In other words, the generally S-polarized light reflected onto the polarizing surface has a component in the P-polarized direction. When this P-polarized component is reflected by the liquid crystal panel to the polarizer, it leaks through the polarizer and onto the projection screen. As a result, the screen is partially illuminated when the light panel is "off" and the screen is supposed to be dark. A quarter-wave plate with its fast axis either perpendicular or parallel to the axis of polarization of the polarizing surface is located between the polarizer and the liquid crystal panel. The phase of the P-polarized component is shifted 180° as the light passes through the quarter-wave plate and then is reflected back through the wave plate by the liquid crystal panel. As a result the light reflected from the "off" liquid crystal panel will be effectively 100% S-polarized when it impinges on the polarizer. Since the light no longer includes a component that can leak through the polarizer the screen will be darker improving the contrast between light and darker areas of the image.

Wave plates are typically produced from uniaxial materials having a single optic axis and two indices of refraction. Light entering the material is divided into two waves which emerge from the material along two axes. Light polarized along the direction of the axis exhibiting the smaller index of refraction travels faster and, therefore, this axis is termed the fast axis. The second axis or slow axis exhibits the larger index of refraction and light polarized along the direction of this axis travels slower. Since a quarter-wave plate produces a phase shift of 90° between perpendicular fast and slow axes, the wave plate has heretofore been considered to be substantially optically symmetrical about either the fast or slow axis. In other words, 180 degree rotation of the quarter-wave plate about the normal to the intersection of the fast and slow axes has been expected to produce the same optical effect.

BRIEF DESCRIPTION OF THE DRAWINGS

FIG. 2 is an elevation view of a wave plate mounting of the present invention.

FIG. 3 is a section view of the wave plate mounting of FIG. 2 taken along line 3—3.

FIG. 4 is an elevation view of a journal box for mounting a wave plate.

FIG. 5 is a section view of the journal box of FIG. 4 taken along line 5—5.

DETAILED DESCRIPTION OF THE INVENTION

Figure 1:
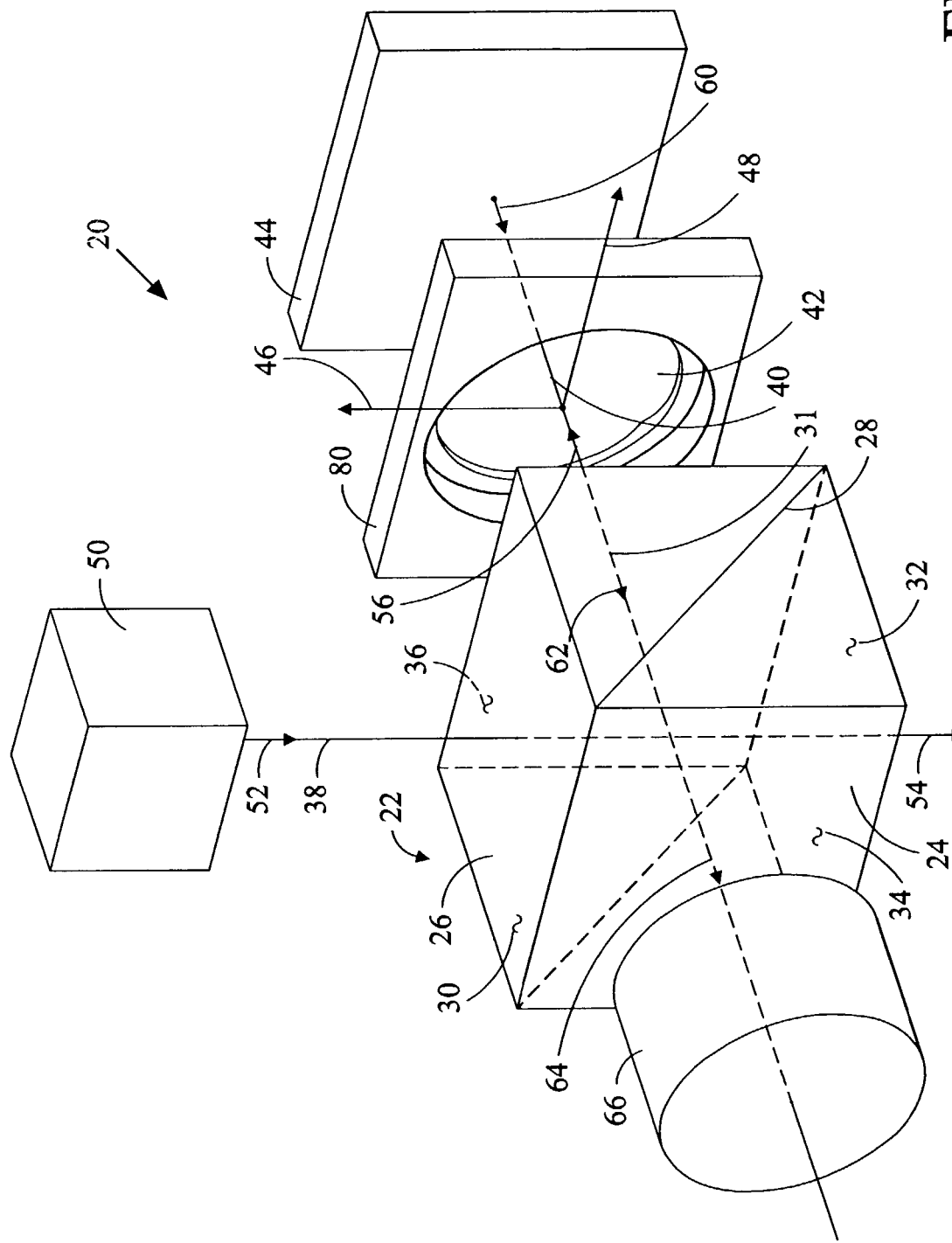
FIG. 1 is a schematic perspective view of an optical section of a typical liquid crystal light valve projector.

The present inventor was astonished to observe that the performance of quarter-wave plates in liquid crystal light valve projectors suggests that a quarter-wave plate is not optically symmetrical and that, all other factors being equal, a lighter or darker screen can be produced by rotating the quarter-wave plate to one of two positions one-half revolution apart. While the adjustment produces significant improvement in the quality of the projected image, establishing better rotational position of the wave-plate is most easily determined after assembly of the liquid crystal light valve projector optics. However, the compact nature of the assembly makes rotation of the wave plate problematic. A compact mounting for a wave plate that permits convenient rotation of the wave plate through an angle of at least one-half revolution and locking of the wave plate in a desired position is desirable.

The optical section of a liquid crystal light valve projector is exemplary of an optical system incorporating an optical retarder or wave plate. The basic optical components of a typical liquid crystal light valve projector 20 are illustrated in FIG. 1A polarizing beam splitter 22 comprises a pair of prisms 24 and 26 with a polarizing beam splitting layer 28 interposed between the prisms. The polarizing beam splitter has four facets 30, 32, 34, and 36. Two facets 30 and 32 are parallel to each other and normal to a first optical axis 38. The other two facets 34 and 36 of the beam splitter 22 are parallel to each other and normal to a second optical axis 40. A quarter-wave plate 42 is positioned between the beam splitter 22 and a liquid crystal panel 44 with its two parallel faces substantially normal to the second optical axis 40. The quarter-wave plate has a fast axis 46 (a polarization direction maximizing the phase velocity) and a slow axis 48 (a polarization direction minimizing the phase velocity) which are perpendicular to each other and, substantially, perpendicular to the second optical axis 40. The fast axis 46 is also arranged either perpendicular or parallel to the axis of polarization of the polarizing beam splitting layer 28.

Light 52 from a source 50 comprising approximately parallel rays enters the beam splitter 22 along the first optical axis 38 and is separated at the splitting layer 28 into a P-polarized component and a S-polarized component. The P-polarized component 54 passes straight through splitting layer 28 in the direction of the first optical axis 38. The S-polarized component 56 is reflected from the splitting layer 28 along the second optical axis 40. The S-polarized light component 56 passes through the quarter-wave plate 42 and impinges on the liquid crystal panel 44.

The liquid crystal panel 44 comprises generally a liquid crystal layer, an array of reflective electrodes, and an array of switching elements arranged behind the reflective electrodes. The switching elements and reflective electrodes of the arrays correspond to picture elements or pixels of the image to be created on liquid crystal panel 44. The liquid crystals of a pixel are isotropic when the pixel is "off," that is, unless a voltage is applied to a switching element corresponding to the pixel. If the pixel is off, the S-polarized light 56 incident on the liquid crystal panel 44 is reflected 62 as S-polarized light by the reflective electrode. However if a voltage is applied to a switching element the pixel is turned "on." When the pixel is "on," the liquid crystals of the pixel become birefringent and the S-polarized light 56 incident on the panel is converted to P-polarized light. As a result, the polarization state of the light reflected from the reflective electrode for a pixel varies depending upon the whether a voltage is applied to the switching element for the pixel.

When P-polarized light reflected from an "on" pixel 62, strikes the polarizing beam splitting surface 28 the light passes through the surface in the direction of optical axis 40. The light passes through the lens 66 and eventually strikes the projection screen (not illustrated). On the other hand, when S-polarized light reflected from an "off" pixel 62 of the liquid crystal panel 44 strikes the polarizing beam splitting surface 28 of the beam splitter 22 the light is reflected away, generally in the direction of the light source 50 along the optical axis 30. The result is a dark pixel on the projection screen, However, the polarization of light from the source 50 by the polarizing beam splitting surface 28 is not perfectly efficient. The light source 50 is not a point source and while the light is generally incident on the polarizing beam splitting surface 28 along the optical axis 38, some of the light strikes the beam splitting surface 28 at other angles. As a result, the direction of light reflected from an "off" pixel of the liquid crystal panel 44 is not identical to the S-polarization direction of the polarizing beam splitting layer 28. In other words, the light reflected from an "off" pixel of the liquid crystal panel 44 includes light having a component polarized in the P-polarization direction relative to the beam splitting surface 28. If this light strikes the polarizing beam splitting surface 28, the light with P-polarization will leak through the beam splitting surface 28 and onto the projection screen, reducing the contrast between light and dark pixels.

The quarter-wave plate 42 positioned between the beam splitter 22 and the liquid crystal panel 44 acts as a half-wave plate because the light first passes through the wave plate and then is reflected back through the wave plate by the liquid crystal panel 44. Each time the light passes through the quarter-wave plate 42 the phase of the P-component is shifted 90°. In other words, the phase of the P-component is shifted 180° by two passes through the quarter-wave plate 42 and the polarization of the light striking polarizing beam splitting surface 28 is in the negative P-polarization direction. As a result, the light striking the polarizing beam splitting surface 28 is effectively 100% S-polarized and does not include a component that can leak through the polarizing beam splitting surface 28 to illuminate dark pixels and reduce the contrast in the projected image.

Wave plates are typically constructed of uniaxial materials such as quartz, mica or oriented polymeric plastic. A uniaxial material is characterized by a single optic axis and two indices of refraction. When a monochromatic light wave is incident on a uniaxial material the light wave is generally divided into two waves which emerge from the material polarized along a "fast" axis and a "slow" axis. If the uniaxial material is arranged correctly with respect to the optic axis of the incident light, the minimum index of refraction is exhibited for one polarization of a plane polarized wave and the maximum index of refraction will be exhibited for the second polarization. Light polarized along the direction of the axis with the lesser index of refraction travels faster and, therefore, the axis is termed the fast axis. The second axis or slow axis exhibits the larger index of refraction and light polarized along the direction of this axis travels slower. Since a quarter-wave plate produces a relative phase shift of 90° for light polarized along the perpendicular fast and slow axes, the wave plate has heretofore been considered to be generally optically symmetrical about the fast and slow axes. Rotating a quarter-wave plate one-half revolution about a normal to the intersection of the fast and slow axes was expected produce the same effect on the incident polarized light. However, the present inventor observed that the level of illumination of a dark projection screen is not equal when a quarter wave plate positioned between a liquid crystal light panel and a beam splitter is rotated one half revolution about the normal to the intersection of the fast 46 and slow axis 48. While the reason for this phenomenon is not fully understood, rotation of the quarter-wave plate to one of two positions separated by one-half a revolution maximizes the contrast in a projected image.

The present invention provides a mounting apparatus for a wave plate that permits the wave plate of an assembled liquid crystal light valve projector to be rotated at least one-half revolution about the intersection of the fast and slow axes to an orientation producing a maximum contrast in a projected image. The wave plate can then be locked into the rotational orientation producing the best result. The relative arrangements of components of the liquid crystal light valve projector are illustrated in FIG. 1. However, the actual components are typically much smaller than illustrated in FIG. 1 and typically arranged immediately adjacent to each other. Therefore, if rotational adjustment is to be conveniently accomplished with an assembled projector, the mechanism must be very compact and must facilitate rotation of the wave plate without disassembly of the projector. Referring to FIGS. 2 and 3, the wave plate mounting apparatus 80 of the present invention provides a compact assembly facilitating convenient rotation of the wave plate. The wave plate mounting apparatus comprises generally a journal box 82 adapted to support a wave plate 42 for rotation. The journal box 82 is adapted for attachment to a supporting frame (not illustrated) of the liquid crystal light valve projector 20 by riveting, welding, or otherwise, The wave plate 42 is supported for rotation in the journal box 82 by a frame 84. While the illustrated frame 84 is an annulus surrounding a circular wave plate 42, a wave plate of arbitrary shape could be retained in an appropriate frame. Referring to FIGS. 4 and 5, the journal box 82 includes portions defining a stepped bore 85. A portion of the stepped bore 85 forms an aperture 86 which is aligned generally with the optical axis 40 of the projector permitting light to pass between the polarizing beam splitting surface 28 and the liquid crystal panel 44. A stepped portion of the bore 85 forms concentric stepped surfaces 87 and 89 to support the frame 84 for rotation about a normal to the intersection (coincident with the optical axis 44) of the fast and slow axes of wave plate.

To facilitate rotation of the wave plate in the close confines of the liquid light valve projector assembly, a bendable member or tape 88 having a first end affixed to the frame 84 is wound around the periphery of the frame 84. The first end of the tape 88 is affixed to the frame 84 by either inserting an end portion into a slot (not illustrated) cut in the frame, by welding, or other means of attachment. The tape 88 is restrained on the periphery of the frame 84 by a groove formed a by shoulder portion 97 of the frame projecting radially from the frame 84 at one face. The second end of the tape 88 is fed through a groove 90 in the journal box 82. To rotate the wave plate 42, the second end of the tape 88 is pulled or pushed, altering the length of the tape 88 proximate to the periphery of the frame 84. After adjustment, the rotational orientation of the wave plate producing the best results can be locked into the assembly with a set screw 92 or other lock device anchoring position of the second end of the tape 88 relative to the frame 84 (or any other technique for restricting rotational movement of the wave plate). With the mounting of the present invention, a wave plate can be conveniently rotated in an assembled projector to the orientation producing the better results and locked into position for use. It is noted that the wave plate is preferably rotatable about at least 90 degrees or more, more preferably 180 degrees or more, and best if 360 degrees or more.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of adjusting a wave plate for an imaging system comprising:
   (a) providing a beam splitter;
   (b) providing an imaging device;
   (c) providing a supporting structure including said wave plate positioned between said beam splitter and said imaging device; and
   (d) mechanically adjusting the imaging system by rotating said wave plate about an axis perpendicular to said wave plate located within the periphery of said wave plate over a range in excess of 90 degrees, wherein said wave plate is subsequently maintained in the same rotational position irrespective of a change in a polarization state of light passing through said wave plate.

2. The method of claim 1 further comprising adjusting the imaging system by rotating said wave plate over a range in excess of 180 degrees.

3. The method of claim 2 wherein said adjusting is to align at least one optical axis of said wave plate with respect to said imaging device.

4. The method of claim 1 further comprising adjusting the imaging system by rotating said wave plate over a range in excess of 360 degrees.

5. The method of claim 4 wherein said adjusting is to align at least one optical axis of said wave plate with respect to said imaging device.

6. The method of claim 5 further comprising selecting an optically preferable orientation of said wave plate from two orientations approximately 180 degrees apart.

7. The method of claim 1 wherein said adjusting is to align at least one optical axis of said wave plate with respect to said imaging device.

8. A method of increasing contrast in an image displayed by an imaging system, said method comprising the steps of:
   (a) providing a beam splitter;
   (b) providing an imaging device;
   (c) providing a wave plate supporting structure;
   (d) rotatably supporting a wave plate in said wave plate supporting structure, said wave plate positioned between said beam splitter and said imaging device; and
   (e) mechanically increasing contrast in an image by rotating said wave plate about an axis perpendicular to said wave plate located within the periphery of said wave plate over a range in excess of 90 degrees, wherein said wave subsequently maintained in the same rotational position irrespective of a change in a polarization state of light passing through said wave plate.

9. The method of claim 8 wherein said adjusting is to align at least one optical axis of said wave plate with respect to said imaging device.

10. The method of claim 8 further comprising adjusting contrast in said image by rotating said wave plate over a range in excess of 180 degrees.

11. The method of claim 10 wherein said adjusting is to align at least one optical axis of said wave plate with respect to said imaging device.

12. The method of claim 8 further comprising adjusting contrast in said image by rotating said wave plate over a range in excess of 360 degrees.

13. The method of claim 12 wherein said adjusting is to align at least one optical axis of said wave plate with respect to said imaging device.

14. The method of claim 8 further comprising the step of selecting an optically preferable orientation of said wave plate from two orientations approximately 180 degrees apart.

15. A method of increasing contrast in an image displayed by an imaging system, said method comprising the steps of:
   (a) providing a beam splitter;
   (b) providing an imaging device;
   (c) providing a wave plate supporting structure;
   (d) rotatably supporting a wave plate in said wave plate supporting structure, said wave plate positioned in a first rotational orientation between said beam splitter and said imaging device; and
   (e) mechanically increasing contrast in an image by rotating said wave plate to a second rotational orientation about an axis perpendicular to said wave plate located within the periphery of said wave plate over a range in excess of 90 degrees; and
   (f) locking said wave plate into said second orientation.

16. The method of claim 15 wherein said adjusting is to align at least one optical axis of said wave plate with respect to said imaging device.

17. The method of claim 15 further comprising adjusting contrast in said image by rotating said wave plate over a range in excess of 180 degrees.

18. The method of claim 17 wherein said adjusting is to align at least one optical axis of said wave plate with respect to said imaging device.

19. The method of claim 15 further comprising adjusting contrast in said image by rotating said wave plate over a range in excess of 360 degrees.

20. The method of claim 19 wherein said adjusting is to align at least one optical axis of said wave plate with respect to said imaging device.

* * * * *